United States Patent Office 3,817,919
Patented June 18, 1974

3,817,919
STABILIZATION OF POLYPHENYLENE OXIDES
Seizo Nakashio, Nishinomiya, Toshio Takemura, Kyoto, and Takashi Maruyama, Kunio Ota, and Tetsuki Seto, Takatsuki, Japan, assignors to Sumitomo Chemical Company, Ltd., Osaka, Japan
No Drawing. Continuation of abandoned application Ser. No. 10,998, Feb. 12, 1970. This application Apr. 3, 1972, Ser. No. 240,874
Claims priority, application Japan, Feb. 27, 1969, 44/15,080
Int. Cl. C08g 23/20
U.S. Cl. 260—47 ET                                                    13 Claims

ABSTRACT OF THE DISCLOSURE

Polyphenylene oxides are stabilized to thermal oxidation by treatment with boron-containing compounds such as, for example, boron trihalides, trialkylborons or complex salts thereof. The resulting polyphenylene oxides are not colored, do not cause degradation in strength and are not deteriorated in flow property, even when exposed to high temperatures. The boron-containing compound is ordinarily used in a proportion of 0.01–10% by weight based on the weight of the polyphenylene oxide. The above-mentioned treatment is effected either in the presence or absence of a treating medium. Further, the boron-containing compound may be in the form of gas.

---

This is a continuation of application Ser. No. 10,998, filed Feb. 12, 1970 and now abandoned.

This invention relates to a process for stabilizing polyphenylene oxides to thermal oxidation by treatment with boron-containing compounds.

Polyphenylene oxides have been watched with keen interest as resins excellent in thermal resistance, chemical resistance, and mechanical and electrical properties. However, these polymers are undesirably low in oxidation resistance at elevated temperatures and, particularly when exposed to high temperatures in air or in the presence of oxygen, they undergo thermal oxidation relatively quickly to cause coloration, degradation in strength and deterioration in flow property.

As the result of various studies on causes for such deterioration in properties of the said polymers due to thermal oxidation and on processes for the prevention thereof, the present inventors have found that such thermal oxidation chiefly progresses by depolymerizations induced by free hydroxyl groups present at the terminals of polyphenylene oxides or by reactions of electron transfer due to the release of hydrogen atoms at the terminal hydroxyl groups, and that in the case of polyphenylene oxides having, in at least one of the 2-, 3-, 5- and 6-positions of the phenylene groups, such oxidizable substituents as hydrocarbon, substituted hydrocarbon or alkoxy groups, these substituents undergo partial oxidation at the time of polymerization to form aldehyde or hydroxyl groups, which become causes for the deterioration in properties of the polymers due to thermal oxidation. Under certain polymerization conditions, hydroperoxides are formed in the polymers, which also become causes for the deterioration in properties of the polymers due to thermal oxidation. Further, it is considered that in the polymer, there are present slight amounts of impurities incapable of being easily removed according to ordinary treatment procedures, which also bring about the deterioration in properties of the polymers due to thermal oxidation. In addition thereto, there are some causes which have not been elucidated yet.

The present inventors have now found that when treated with boron-containing compounds, polyphenylene oxides can be prevented from thermal oxidation.

An object of the present invention is to provide a process for stabilizing polyphenylene oxides to thermal oxidation.

Another object of the invention is to provide stabilized polyphenylene oxides which, even when exposed to high temperatures, do not cause coloration, degradation in strength and deterioration in flow property.

Other objects and effects of the present invention will become apparent from the following description.

At present, it is not clear by what reaction the stabilization of polyphenylene oxides can be attained by treatment with such a slight amount of boron-containing compound as mentioned later. However, the reaction according to the present invention is surprisingly effective, and the fact that polyphenylene oxides which are susceptible to thermal oxidation can be stabilized effectively and in a short period of time, has never been expected heretofore and brings about extremely useful results from the industrial standpoint.

In accordance with the present invention, there is provided a process for stabilizing polyphenylene oxides, are treated with boron-containing compounds.

Polyphenylene oxides which are stabilized according to the present process are represented by the formula,

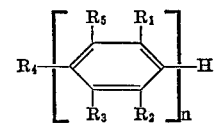

wherein $R_1$, $R_2$, $R_3$ and $R_5$ are selected from hydrogen and halogen atoms and hydrocarbons, substituted hydrocarbon, cyano, hydrocarbonoxy, substituted hydrocarbonoxy, nitro and amino groups, $R_4$ is selected from hydrogen and halogen atoms, and $n$ is an integer representing the degree of polymerization. Examples of $R_1$, $R_2$, $R_3$ and $R_5$ include hydrogen, chlorine, bromine, iodine, and methyl, ethyl, propyl, allyl, phenyl, benzyl, methylbenzyl, chloromethyl, bromomethyl, cyanoethyl, cyano, methoxy, ethoxy, chloromethoxy, phenoxy, nitro and amino groups, and examples of $R_4$ include hydrogen, chlorine, bromine and iodine.

Concretely, the above-mentioned polyphenylene oxides include, for example, poly-2,6-dimethyl-1,4-phenylene oxide,
poly-2,6-diethyl-1,4-phenylene oxide,
poly-2,6-dipropyl-1,4-phenylene oxide,
poly-2-methyl-6-isopropyl-1,4-phenylene oxide,
poly-2,6-dimethoxy-1,4-phenylene oxide,
poly-2,6-dichloromethoxy-1,4-phenylene oxide,
poly-2,6-dichloromethyl-1,4-phenylene oxide,
poly-2,6-dibromomethyl-1,4-phenylene oxide,
poly-2,6-diphenyl-1,4-phenylene oxide,
poly-2,6-ditolyl-1,4-phenylene oxide,
poly-2,6-dichloro-1,4-phenylene oxide and
poly-2,5-dimethyl-1,4-phenylene oxide.

Boron-containing compounds which are used in the present process to treat the polyphenylene oxides are boron compounds represented by the formula,

wherein $R'_1$, $R'_2$ and $R'_3$ are selected from halogen atoms, hydrocarbon groups and substituted hydrocarbon groups, and 2 or 3 members thereof may form a ring. The boron compounds represented by the above-mentioned formula may be used in the form of complexes with various compounds, and the use of such complexes results in smoother progress of the reaction. Ligands of the complexes are selected from water, and amine, amide, nitrile, ether, hydroxy, carboxylic acid, sulfonic acid, ester, ketone, nitro and phosphine compounds.

Concretely, the above-mentioned boron-containing compounds include, for example, boron trifluoride, boron trichloride, boron tribromide, boron triiodide, trimethylboron, triethylboron, tri-n-butylboron, difluoromethylboron, chlorodimethylboron, difluorovinylboron, B-chloroboraindane.

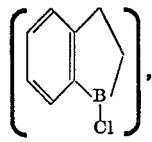

boron trifluoride-aniline complex salt, boron trifluoride-piperidine complex salt, boron trifluoride-pyridine complex salt, boron trifluoride-ethylamine complex salt, boron trifluoride-triethylamine complex salt, boron trifluoride-N-methyl-N-phenylacetamide complex salt, boron trifluoride-acetonitrile complex salt, boron trifluoride-diethyl ether complex salt, boron trifluoride-butyl ether complex salt, boron trifluoride-tetrahydrofuran complex salt, boron trifluoride-methanol complex salt, boron trifluoride-ethanol complex salt, boron trifluoride-phenol complex salt, boron trifluoride-p-cresol complex salt, boron trifluoride - 2,6 - ditertiary butyl p-cresol complex salt, boron trifluoride-acetic acid complex salt, boron trifluoride-ethyl formate complex salt, boron trifluoride-methyl acetate complex salt, boron trifluoride-acetone complex salt, boron trifluoride-trimethylphosphine complex salt, boron trichloride-aniline complex salt, boron trichloride-pyridine complex salt, dichloroethylboron-trimethylamine complex salt, boron tribromide-aniline complex salt, boron tribromide-pyridine complex salt, trimethylboron-ammonia complex salt, trimethylboron-triethylphosphine complex salt and trimethyl-boron-ethylamine complex salt.

The amount of the boron-containing compound used in the present process for stabilizing the polyphenylene oxide is not particularly limited, but is ordinarily 0.01–10% by weight, preferably 0.1–5% by weight, based on the weight of the polyphenylene oxide.

Generally, the treatment of the polyphenylene oxide with the boron-containing compound is desirably effected in the presence of a treating medium in order to facilitate the control of the treating conditions and the treatment of the product. For example, the treatment is carried out in such a manner that the boron-containing compound is added directly to a solution of the polymer in a treating medium or to a polymerization reaction mixture comprising the polymer and a treating medium. The treating procedure can be optionally selected according to the polymerization conditions or the stabilization conditions. The treating medium may be any of the known media so far as it is inert to the polyphenylene oxide and the boron - containing compound and is in the form of a liquid at the treating temperature. Even when the treatment is effected in the presence of a small amount of a medium active to the boron-containing compound, there is brought about no other detrimental effect than that the boron-contaning compound is consumed to a certain extent by reaction therewith.

Examples of such treating media include chain and cyclic aliphatic hydrocarbons, aromatic hydrocarbons and derivatives of these hydrocarbons such as, for example, nitrides, halides, hydroxides, ethers, ketones, lactones and sulfonates. Concretely, there are used, in general, heptane, benzene, toluene, xylene, monochlorobenzene, dichlorobenzene, nitrobenzene, β-methoxyethyl alcohol, methyl cyclohexane, dichloromethane, dichloroethane, chloroform, cresol, diethylether, tetrahydrofuran, dioxane, cyclohexanone, acetonitrile and mixtures thereof. These media are used in an amount of 1–200 times, preferably 2–100 times, the weight of the polyphenylene oxide.

In carrying out the treatment in the absence of treating medium, there is adopted a suitable process effected ordinarily such as, for example, a process in which a powder of the polyphenylene oxide is brought into contact with the boron-containing compound. The boron-containing compound may be in any form of a gas or a liquid.

The treatment can be effected at normal pressure but may also be carried out under pressure or under reduced pressure in order to bring the brono-containing compound and/or the treating medium to a desired phase.

The treating temperature can be freely selected within a range where no decomposition of the polyphenylene oxide is brought about, but is preferably below 100° C., in general.

The treating time varies depending on the kind of the boron-containing compound and on the treating temperature, but ordinarily the treating time is within the range of 2 minutes to 2 hours, preferably 5 minutes to 1 hour.

In case the treatment of the polyphenylene oxide with the boron-containing compound has been effected in the presence of a treating medium, the reaction liquid obtained after completion of the treatment is charged into or incorporated with a suitable amount of a poor solvent for the polyphenylene oxide, whereby a polymer precipitates. The polymer is then separated by filtration, washed and dried to accomplish the desired object. Examples of the poor solvent for polyphenylene oxide include aliphatic hydrocarbons such as heptane, hexane, petroleum ether, ligroin, etc., alcohols such as methanol, ethanol, propanol, butanol, cyclohexanol, etc., ketones such as acetone, methylethylketone, etc., ethers such as diethyl ether, benzyl ether, etc., acids such as sulfuric acid, acetic acid, etc., acid anhydrides such as acetic anhydride, etc. and acid amides such as dimethylformamide, etc.

In some cases, the stabilized polymer may be obtained according to a process carried out by vaporizing the reaction liquid to dryness or to a process using a spray-dryer.

When a polyphenylene oxide stabilized according to the present process and an unstabilized polyphenylene oxide are individually pressed at 270° C. for 10 minutes under a pressure of 100 kg./cm.$^2$ to prepare sheets and the resulting sheets are compared in coloration, it is observed that the sheet from the unstabilized polymer has been thermally oxidized and colored to brown, whereas the sheet from the stabilized polymer has been scarcely colored.

The present process brings about such an important advantage that polyphenylene oxides stable to thermal oxidation can be obtained in high yields.

The process of the present invention is illustrated below with reference to examples, but the examples are illustrative and are not limitative, and various modifications are possible within the scope of the invention.

EXAMPLE 1

100 g. of yellowish white poly - 2,6 - dimethyl-1,4-phenylene oxide having an intrinsic viscosity of 0.72 dl./g. as measured in chloroform at 25° C. was dissolved in 900 ml. of xylene. To this solution was added 10 g. of a boron trifluoride-diethyl ether complex salt, and the resulting mixture was treated at 70° C. for 1 hour while being stirred. The resulting mixture was charged into about 2,500 ml. of methanol, and a precipitate formed was separated by filtration, was washed with methanol and water, and was then dried at 90° C. for 10 hours to obtain 96.1 g. of a stabilized and decolored white polymer having an intrinsic viscosity of 0.64 dl./g., yield 96.1%.

The resistance to thermal oxidation of the resulting stabilized polyphenylene oxide was estimated by measuring the coloration and gel formation ratio thereof at the time of heating.

The stabilized polyphenylene oxide and unstabilized polyphenylene oxide were individually pressed at 270° C. for 10 minutes under a pressure of 100 kg./cm.$^2$ to prepare sheets of 1 mm. in thickness, and the resulting sheets were compared in coloration to find that the sheet from the unstabilized polymer had been colored to brown, whereas the sheet from the stabilized polymer had been scarcely colored.

Further, the stabilized polyphenylene oxide and the unstabilized polyphenylene oxide were individually incorporated with 1.5% by weight, based on the weight of the polymer, of BHT (2,6 - di - tert-butyl-p-cresol) as a stabilizer. The mixtures were roll-kneaded at 280° C. for 7 minutes and were then pressed at 270° C. for 10 minutes under a pressure of 100 kg./cm.$^2$ to prepare sheets of 1 mm. in thickness. The resulting sheets were compared in coloration to fined that the sheet from the stabilized polymer had been colored to dark brown, whereas the sheet from the stabilized polymer had been scarcely colored.

bilized and decolored polymer having an intrinsic viscosity of 0.60 dl./g.

The resistances to thermal oxidation of the stabilized polymer and unstabilized polymer were estimated by pressing in a way similar to that in Example 1, whereby the sheet from the unstabilized polymer was colored to brown, whereas the sheet from the stabilized polymer was not colored.

EXAMPLE 4

Example 3 was repeated, except that each of the boron trifluorides shown in Table 1 was used in place of the boron trifluoride-phenol complex salt and the treatment was effected under such treating temperature and treating time conditions as set forth in Table 1. The resulting mixtures were treated in the same manner as in Example 1 to obtain stabilized polymers.

The resistances to thermal oxidation of the stabilized polymers and unstabilized polymer were estimated by pressing in a way similar to that in Example 1, whereby the sheet from the unstabilized polymer was colored to brown, whereas the sheets from the stabilized polymers were scarcely colored.

TABLE 1

| Run No. | Name of compound | Amount (g.) | Treating temp. (° C.) | Treating time (min.) | Yield (weight percent) |
|---|---|---|---|---|---|
| 1 | Boron trifluoride-methanol complex salt | 1.0 | 70 | 30 | 96.3 |
| 2 | Boron trifluoride-ethanol complex salt | 0.5 | 60 | 10 | 97.7 |
| 3 | Boron trifluoride-acetic acid complex salt | 1.0 | 50 | 30 | 96.8 |
| 4 | Boron trifluoride-ethyl formate complex salt | 0.5 | 60 | 30 | 97.5 |
| 5 | Boron trifluoride-phenol complex salt | 1.0 | 60 | 30 | 94.1 |
| 6 | Boron trifluoride-phenol complex salt | 0.3 | 50 | 5 | 97.2 |
| 7 | Boron trifluoride-diethyl ether complex salt | 0.1 | 70 | 60 | 97.1 |
| 8 | Boron trifluoride-diethyl ether complex salt | 0.2 | 30 | 10 | 98.8 |
| 9 | Boron trifluoride-acetonitrile complex salt | 0.5 | 60 | 30 | 97.9 |
| 10 | Boron trifluoride gas | (¹) | 60 | 30 | 97.5 |

¹ Not weighed.

On the other hand, films of about 0.05 mm. in thickness, which had been prepared from individual chloroform solutions of the stabilized polymer and the unstabilized polymer, were heated at 220° C. for 30 minutes in an oxygen atmosphere. Thereafter each film was extracted with chloroform for 10 hours by use of a Soxhlet's extractor, and the weight ratio of the film after extraction to the film before extraction was measured and was regarded as the gel formation ratio of each polymer. The gel formation ratio of the unstabilized polymer was 91.4%, whereas that of the stabilized polymer was 49.7%.

EXAMPLE 2

20.0 g. of the same poly - 2,6 - dimethyl-1,4-phenylene oxide as in Example 1 was dissolved in 80 ml. of xylene. To this solution was added 0.2 g. of a boron trifluoride-diethyl ether complex salt, and the mixture was treated at 50° C. for 5 minutes while being stirred. The resulting mixture was treated in the same manner as in Example 1 to obtain 19.2 of a stabilized and decolored polymer, yield 95.9%.

The resistances to thermal oxidation of the stabilized polymer and unstabilized polymer were estimated by pressing in a way similar to that in Example 1, whereby the sheet from the unstabilized polymer was colored to brown, whereas the sheet from the stabilized polymer was not colored.

The gel formation ratio of the stabilized polymer was 50.2%.

EXAMPLE 3

10.0 g. of poly - 2,6 - dimethyl - 1,4 - phenylene oxide having an intrinsic viscosity of 0.68 dl./g. as measured in chloroform at 25° C. was dissolved in 90 g. of xylene. To this solution was added 0.6 g. of a boron trifluoride-phenol complex salt, and the mixture was treated at 60° C. for 20 minutes. The resulting mixture was treated in the same manner as in Example 1 to obtain 9.59 g. of sta-

EXAMPLE 5

Example 3 was repeated, except that 0.8 g. of a boron trifluoride-ethylamine complex salt was used in place of the boron trifluoride-phenol complex salt and the treatment was effected at 60° C. for 30 minutes. The resulting mixture was treated in the same manner as in Example 1 to obtain 9.71 g. of a stabilized polymer.

The resistances to thermal oxidation of the stabilized polymer and unstabilized polymer were estimated by pressing in a way similar to that in Example 1, whereby the sheet from the stabilized polymer showed an improved degree of coloration as compared with the sheet from the unstabilized polymer.

EXAMPLE 6

Example 3 was repeated, except that 0.8 g. of boron tribromide was used in place of the boron trifluoride-phenol complex salt and the treatment was effected at 70° C. for 1 hour. The resulting mixture was treated in the same manner as in Example 1 to obtain 9.59 g. of a stabilized polymer.

The resistances to thermal oxidation of the stabilized polymer and unstabilized polymer were estimated by pressing in a way similar to that in Example 1, whereby the sheet from the stabilized polymer showed an improved degree of coloration as compared with the sheet from the unstabilized polymer.

EXAMPLE 7

A reaction liquid containing 19.8 g. of poly-2,6-dimethyl-1,4-phenylene oxide having an intrinsic viscosity of 0.77 dl./g., which had been obtained by subjecting 2,6-xylenol to oxidation polymerization in xylene containing a small amount of methanol in the presence of a manganese chloride-sodium methylate catalyst, was free from the methanol and water by distillation at 50° C. under 100 mm. Hg. To the residue was added 1.0 g. of a boron trifluoride-diethyl ether complex salt, and the mixture was treated at 60° C. for 10 minutes. The resulting mixture was charged into a large amount of methanol containing a small amount of hydrochloric acid, and a precipitate formed was separated by filtration, washed and then dried at 90° C. for 10 hours to obtain 18.8 g. of a stabilized polymer having an intrinsic viscosity of 0.75 dl./g.

The resistances to thermal oxidation of the stabilized polymer and unstabilized polymer were estimated by pressing in a way similar to that in Example 1, whereby the sheet from the stabilized polymer showed a markedly improved degree of coloration as compared with the sheet from the unstabilized polymer.

EXAMPLE 8

10.0 g. of each of the polyphenylene oxides shown in Table 2 was dissolved in 100 ml. of xylene. To this solution was added 0.5 g. of a boron trifluoride-diethyl ether complex salt, and the mixture was treated at 60° C. for 30 minutes while being stirred. The resulting mixture was treated in the same manner as in Example 1 to obtain a stabilized polymer.

The resistances to thermal oxidation of the stabilized polymers and unstabilized polymer were estimated by pressing in a way similar to that in Example 1, whereby the sheets from the unstabilized polymers were colored to brown, whereas the sheet from the stabilized polymer was scarcely colored.

TABLE 2

| Run No. | Polyphenylene oxide | $[\eta]$ (dl./g.[1]) | Yield percent (weight) |
|---|---|---|---|
| 1 | Poly-2,6-dichloro-1,4-phenylene oxide | 0.59 | 95.1 |
| 2 | Poly-2,6-diphenyl-1,4-phenylene oxide | 0.57 | 94.3 |
| 3 | Poly-2,6-dimethoxy-1,4-phenylene oxide | 0.62 | 96.9 |

[1] An intrinsic viscosity measured in chloroform at 25° C.

What we claim is:

1. A process for stabilizing polyphenylene oxides which comprises:
   (1) adding to a solution of a polyphenylene oxide having a structure of the formula:

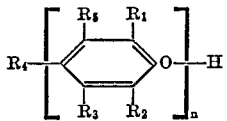

wherein $R_3$ and $R_5$ are hydrogen, $R_1$ is selected from the group consisting of hydrogen, methyl, ethyl, propyl, methoxy, phenyl and chlorine, $R_2$ is selected from the group consisting of methyl, ethyl, propyl, methoxy, phenyl and chlorine, $R_4$ is selected from the group consisting of hydrogen and halogen atoms, and $n$ is an integer representing the degree of polymerization in a medium, a boron-containing compound represented by the general formula,

wherein $R_1'$, $R_2'$ and $R_3'$ are selected from the group consisting of halogen atoms, or a complex salt of said boron compound with water, amines, amides, nitriles, ethers, hydroxy group, carboxylic acids, sulfonic acids, esters, ketones, nitro compounds and phosphines,
   (2) stirring the resultant mixture,
   (3) adding a suitable amount of poor solvent for the polyphenylene oxide to said mixture to precipitate the thus treated polyphenylene oxide,
   (4) separating said treated polyphenylene oxide,
   (5) washing said polyphenylene oxide with the poor solvent for the polyphenylene oxide, and,
   (6) drying the thus obtained polyphenylene oxide.

2. The process of claim 1 wherein said polyphenylene oxide is selected from the group consisting of poly-2,6-dimethyl-1,4-phenylene oxide, poly-2,6-diethyl-1,4-phenylene oxide, poly-2,6-dipropyl-1,4-phenylene oxide, poly-2-methyl-6-isopropyl-4-phenylene oxide, poly-2,6-dimethoxy-1,4-phenylene oxide, poly-2,6-diphenyl-1,4-phenylene oxide, and poly-2,6-dichloro-1,4-phenylene oxide.

3. A process according to claim 1, wherein the polyphenylene oxide is poly-2,6-dimethyl-1,4-phenylene oxide.

4. A process according to claim 1, wherein the medium is selected from benzene, toluene, xylene, monochlorobenzene, dichlorobenzene, nitrobenzene, dichloromethane, dichloroethane, chloroform and cresol.

5. A process according to claim 1, wherein the medium is selected from β-methoxyethyl alochol, methyl cyclohexane, tetrahydrofurane, dioxane, cyclohexanone and acetonitrile.

6. A process according to claim 1, wherein the poor solvent for polyphenylene oxide is selected from heptane, hexane, petroleum ether, ligroin, methanol, ethanol, propanol, butanol, cyclohexanol, acetone, methylethylketone, diethyl ether and benzyl ether.

7. A process according to claim 1, wherein the poor solvent for polyphenylene oxide is selected from acetic acid acid and acetic anhydride.

8. A process according to claim 1, wherein the boron-containing compound is boron trifluoride.

9. A process according to claim 1, wherein the boron-containing compound is selected from boron trichloride, boron tribromide and boron triiodide.

10. A process according to claim 1, wherein the complex salt of said boron compound is selected from boron trifluoride-methanol complex salt, boron trifluoride-ethanol complex salt, boron trifluoride-acetic acid complex salt, boron boron trifluoride-ethyl formate complex salt, boron trifluoride-phenol complex salt, boron trifluoride-diether complex salt, boron trifluoride-ethylamine complex salt, and boron trifluoride-acetonitrile complex salt.

11. A process according to claim 1, wherein the boron-containing compound is directly added to a polymerization reaction mixture comprising the polyphenylene oxide and the medium.

12. A process according to claim 1, wherein an amount of the boron-containing compound is 0.01–10% by weight based on the weight of the polyphenylene oxide.

13. A process according to claim 1, wherein stirring is carried out below 100° C. for a period of time within the range of 2 minutes to 2 hours.

References Cited

UNITED STATES PATENTS

| | | | |
|---|---|---|---|
| 3,228,910 | 1/1966 | Stamatoff | 260—47 |
| 3,236,807 | 2/1966 | Stamatoff | 260—47 |
| 3,260,701 | 7/1966 | McNelis | 260—47 |
| 3,332,909 | 7/1967 | Farnham et al. | 260—47 |
| 3,317,467 | 5/1967 | Brown et al. | 260—47 |
| 3,362,934 | 1/1968 | Bolon | 20—47 |

FOREIGN PATENTS 6,704,682   6/1967   Netherlands.

MELVIN GOLDSTEIN, Primary Examiner

U.S. Cl. X.R.

260—45.7 R, 45.7 S, 45.85, 45.9